United States Patent
Lewandowski et al.

(10) Patent No.: US 12,319,342 B2
(45) Date of Patent: Jun. 3, 2025

(54) VEHICLE STEERING CONTROL

(71) Applicant: Ford Global Technologies, LLC, Dearborn, MI (US)

(72) Inventors: Andrew Denis Lewandowski, Sterling Heights, MI (US); Keith Weston, Canton, MI (US); Jordan Barrett, Milford, MI (US); Brendan Francis Diamond, Grosse Pointe, MI (US); David Michael Russell, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 18/067,891

(22) Filed: Dec. 19, 2022

(65) Prior Publication Data

US 2024/0199120 A1 Jun. 20, 2024

(51) Int. Cl.
*B62D 15/02* (2006.01)

(52) U.S. Cl.
CPC ......... *B62D 15/025* (2013.01); *B62D 15/029* (2013.01)

(58) Field of Classification Search
CPC .. B62D 15/025; B62D 15/029; B62D 15/027; B62D 15/0285
See application file for complete search history.

(56) References Cited

U.S. PATENT DOCUMENTS

| | | | |
|---|---|---|---|
| 7,596,440 B2 | 9/2009 | Ono | |
| 10,384,715 B2 | 8/2019 | Schneider et al. | |
| 2005/0274567 A1* | 12/2005 | Turner | B62D 6/007 180/446 |
| 2017/0197679 A1* | 7/2017 | Scaringe | B60K 1/02 |
| 2017/0313341 A1* | 11/2017 | Hoggarth | B62D 1/06 |
| 2019/0009708 A1* | 1/2019 | Siegling | B60Q 1/085 |
| 2019/0367090 A1* | 12/2019 | Shepard | B62D 15/0275 |
| 2020/0070814 A1* | 3/2020 | Park | B62D 15/0285 |
| 2020/0180692 A1* | 6/2020 | Hara | G06F 16/9537 |
| 2020/0269920 A1* | 8/2020 | Millsap | B62D 15/025 |
| 2020/0348669 A1* | 11/2020 | Kim | E05F 15/73 |
| 2020/0391726 A1* | 12/2020 | Qin | B60W 50/0098 |
| 2021/0188247 A1* | 6/2021 | Nakayama | B60L 50/15 |
| 2021/0197794 A1* | 7/2021 | Nakayama | B60W 20/40 |
| 2022/0063631 A1* | 3/2022 | Hassani | B60W 40/08 |
| 2023/0382296 A1* | 11/2023 | Kammann | B60Q 1/507 |

FOREIGN PATENT DOCUMENTS

| | | | | |
|---|---|---|---|---|
| CN | 112017434 A | * | 12/2020 | ........... G08G 1/0129 |
| JP | 6817768 B2 | | 1/2021 | |
| WO | WO-2022078694 A1 | * | 4/2022 | ............. B60K 35/00 |

* cited by examiner

*Primary Examiner* — Joseph J Dallo
(74) *Attorney, Agent, or Firm* — Frank A. MacKenzie; Brooks Kushman P.C.

(57) ABSTRACT

A vehicle maneuvering scenario can be identified based on data from vehicle sensors including at least one of (a) a location of the vehicle, or (b) data indicating that a first steering wheel rotation in a first direction and a second steering wheel rotation in a second direction each exceed a rotation threshold. A steering ratio can be determined based on the vehicle maneuvering scenario. Vehicle steering can then be actuated according to the steering ratio.

20 Claims, 6 Drawing Sheets

VEHICLE STEERING CONTROL

BACKGROUND

Modern vehicles can include drive-by-wire steering systems. In a drive-by-wire system, a controller detects user input to a steering wheel, i.e., turning the steering wheel, and translates the user input to a command or commands to steering system actuators. The actuators provide electromechanical inputs to a steering system, e.g., to a vehicle steering rack, to control a direction of, e.g., turn, vehicle wheels. The commands to actuators can be based on a steering ratio, i.e., a ratio of an angle of rotation of a steering wheel to a commanded turning angle of the vehicle wheels.

DETAILED DESCRIPTION

As disclosed herein, a computer in a vehicle can identify a current vehicle maneuvering scenario based on data from vehicle sensors including location data and/or data indicating that a first steering wheel rotation in a first direction and a second steering wheel rotation in a second direction each exceed a rotation threshold. Then the computer can determine a steering ratio (i.e., ratio of an angle of rotation of a steering wheel to an angle of movement of vehicle wheels) based on the current vehicle maneuvering scenario; and actuate vehicle steering according to the steering ratio.

A maneuvering scenario means a vehicle operation in which a vehicle steering wheel angle and/or steering angle is expected or determined to change by more than a threshold amount or than a threshold number of times within a minimum amount of time and/or within a minimum distance of travel. A maneuvering scenario may be characterized according to a maneuvering scenario type; a maneuvering scenario type is a category of vehicle maneuver, such as, by way of example and without limitation, a parallel parking scenario, a reverse-parking scenario, a forward-parking scenario, or a trailer maneuvering scenario. A maneuvering scenario type can include parameters to govern operating a vehicle during the maneuvering scenario, such as a maximum expected angle of movement of vehicle wheels, a maximum speed, etc. By specifying and/or adjusting a steering ratio by which a vehicle is operated during a maneuvering scenario, as described herein, vehicle operation can be enhanced. For example, an amount by which an operator must rotate a steering wheel and/or number of times to change directions of rotation of a steering wheel may be reduced. Further, vehicle operation can be enhanced by providing for more efficient and/or accurate maneuvering.

A system comprises a processor and a memory, the memory storing instructions executable by the processor such that the processor is programmed to identify a vehicle maneuvering scenario based on data from vehicle sensors including at least one of (a) a location of the vehicle, or (b) data indicating that a first steering wheel rotation in a first direction and a second steering wheel rotation in a second direction each exceed a rotation threshold; determine a steering ratio based on the vehicle maneuvering scenario; and actuate vehicle steering according to the steering ratio.

The instructions can further include instructions for any one or more of the following: to identify the vehicle maneuvering scenario based on a vehicle speed to determine the steering ratio based on a vehicle speed; to determine the steering ratio based on a type of the vehicle maneuvering scenario; to determine the steering ratio based on user input confirming the vehicle maneuvering scenario; to adjust the steering ratio based on historical data for the location of the vehicle; and or to suppress an adjustment to the steering ratio based on the vehicle location; to adjust the steering ratio as the location changes.

The type of the vehicle maneuvering scenario can be one of a parallel parking scenario, a reverse-parking scenario, a forward-parking scenario, or a trailer maneuvering scenario.

The data from the vehicle sensors to identify the current vehicle maneuvering scenario can further include data about a vehicle occupant. The data about a vehicle occupant can include image data showing that the occupant is checking vehicle mirrors and/or looking out of a rear window.

The instructions can further include instructions to determine a second steering ratio based on determining a second maneuvering scenario after actuating the vehicle steering according to the steering ratio, and to actuate the vehicle steering according to the second steering ratio.

The data from the vehicle sensors to identify the current vehicle maneuvering scenario can further include data about a third steering wheel rotation and a fourth steering wheel rotation each exceeding the rotation threshold.

The steering ratio can be calibrated for a type of the vehicle and/or for a speed of the vehicle.

A method comprises identifying a vehicle maneuvering scenario based on data from vehicle sensors including at least one of (a) a location of the vehicle, or (b) data indicating that a first steering wheel rotation in a first direction and a second steering wheel rotation in a second direction each exceed a rotation threshold; determining a steering ratio based on the vehicle maneuvering scenario; and actuating vehicle steering according to the steering ratio.

The method can further include steps for any one or more of the following: to identify the vehicle maneuvering scenario based on a vehicle speed to determine the steering ratio based on a vehicle speed; to determine the steering ratio based on a type of the vehicle maneuvering scenario; to determine the steering ratio based on user input confirming the vehicle maneuvering scenario; to adjust the steering ratio based on historical data for the location of the vehicle; and or to suppress an adjustment to the steering ratio based on the vehicle location; to adjust the steering ratio as the location changes.

The type of the vehicle maneuvering scenario can be one of a parallel parking scenario, a reverse-parking scenario, a forward-parking scenario, or a trailer maneuvering scenario.

The data from the vehicle sensors to identify the current vehicle maneuvering scenario can further include data about a vehicle occupant. The data about a vehicle occupant can include image data showing that the occupant is checking vehicle mirrors and/or looking out of a rear window.

The method can further include instructions determining a second steering ratio based on determining a second maneuvering scenario after actuating the vehicle steering according to the steering ratio, and to actuate the vehicle steering according to the second steering ratio.

The data from the vehicle sensors to identify the current vehicle maneuvering scenario can further include data about a third steering wheel rotation and a fourth steering wheel rotation each exceeding the rotation threshold.

The steering ratio can be calibrated for a type of the vehicle and/or for a speed of the vehicle.

Figure 1:
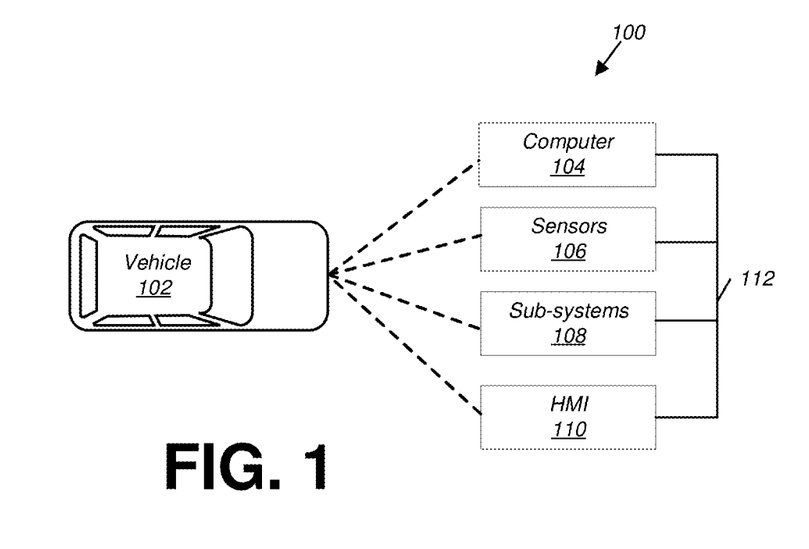
FIG. 1 is a block diagram of an example vehicle operation system.

Referring to FIG. 1, a vehicle operation system 100 can include a vehicle 102 and elements therein. A vehicle 102 may be any suitable type of ground vehicle, e.g., a passenger or commercial automobile such as a sedan, a coupe, a truck, a sport utility, a crossover, a van, a minivan, a taxi, a bus, etc. The vehicle 102 can include a vehicle computer 104 (and typically includes multiple computers 104), various sensors 106, including one or more camera sensors 106-C (see FIG. 4), subsystems or components 108, including a steering subsystem 108-S (see FIG. 2), a human machine interface (HMI) 110, and a vehicle network 112 that facilitates communications between various elements including computers 104, sensors 106, subsystems 108, and HMI 110.

A vehicle computer 104 includes a processor and a memory. The memory includes one or more forms of computer readable media, and stores instructions executable by the vehicle computer 104 for performing various operations, including as disclosed herein. For example, a vehicle computer 104 can be a generic computer with a processor and memory as described above and/or may include an electronic control unit (ECU) or controller for a specific function or set of functions, and/or a dedicated electronic circuit including an ASIC (application specific integrated circuit) that is manufactured for a particular operation, e.g., an ASIC for processing sensor 106 data and/or communicating the sensor 106 data. In another example, a vehicle computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components 108 inside an FPGA may be configured based on VHDL programming, e.g. stored in a memory electrically connected to the FPGA circuit. In some examples, a combination of processor(s), ASIC(s), and/or FPGA circuits may be included in a computer 104.

The memory can be of any type, e.g., hard disk drives, solid state drives, servers, or any volatile or non-volatile media. The memory can store the collected data sent from the sensors 106. The memory can be a separate device from the computer 104, and the computer 104 can retrieve information stored by the memory via a network in the vehicle 102, e.g., over a CAN bus, a wireless network, etc. Alternatively or additionally, the memory can be part of the computer 104, e.g., as a memory of the computer 104. The computer 104 may include programming to operate one or more of vehicle 102 brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer 104, as opposed to a human operator, is to control such operations. Additionally, the computer 104 may be programmed to determine whether and when a human operator is to control such operations.

The computer 104 may include or be communicatively coupled to, e.g., via a vehicle network 112 such as a communications bus as described further below, more than one processor, e.g., included in subsystems 108 such as sensors 106, electronic control units (ECUs) or the like included in the vehicle 102 for monitoring and/or controlling various vehicle subsystems, e.g., a powertrain controller, a brake controller, a steering controller, etc. The vehicle computer 104 described herein could include a plurality of devices, e.g., ECUs or the like, for performing operations described herein to the vehicle computer 104. Therefore, alternatively or additionally, in cases where the computer 104 actually comprises a plurality of devices, the vehicle 102 communication network may be used for communications between devices represented as the computer 104 in this disclosure. Further, as mentioned below, various controllers and/or sensors 106 may provide data to the computer 104 via the vehicle 102 communication network.

The vehicle 102 typically includes a variety of sensors 106. A sensor 106 is a device that can obtain one or more measurements of one or more physical phenomena. Some sensors 106 detect internal states of the vehicle 102, for example, wheel speed, wheel orientation, and engine and transmission variables. Some sensors 106 detect the position or orientation of the vehicle 102, for example, global positioning system GPS sensors 106; accelerometers such as piezo-electric or microelectromechanical systems MEMS; gyroscopes such as rate, ring laser, or fiber-optic gyroscopes; inertial measurements units IMU; and magnetometers. Some sensors 106 detect the external world and/or vehicle 102 interior, for example, radar sensors 106, scanning laser range finders, light detection and ranging LIDAR devices, and image processing sensors 106 such as cameras 106-C (see FIGS. 2-4). A LIDAR device detects distances to objects by emitting laser pulses and measuring the time of flight for the pulse to travel to the object and back. Some sensors 106 are communications devices, for example, vehicle-to-infrastructure V2I or vehicle-to-vehicle V2V devices.

Sensor 106 operation can be affected by obstructions, e.g., dust, snow, insects, etc. Often, but not necessarily, a sensor 106 includes a digital-to-analog converter to converted sensed analog data to a digital signal that can be provided to a digital computer 104, e.g., via a digital network such as described herein. Sensors 106 can include a variety of devices, and can be disposed to sense an environment, provide data about a machine, etc., in a variety of ways. For example, a sensor 106 could be mounted to a stationary infrastructure element on, over, or near a road. Moreover, various controllers in a vehicle 102 may operate as sensors 106 to provide data via the vehicle network 112 or bus, e.g., data relating to vehicle 102 speed, acceleration, location, subsystem and/or subsystem 108 status, etc. Further, other sensors 106, in or on a vehicle 102, stationary infrastructure element, etc., infrastructure could include cameras 106-C (see FIG. 4), short range radar, long range radar, LIDAR, and/or ultrasonic transducers, weight sensors 106, accelerometers, motion detectors, etc., i.e., sensors 106 to provide a variety of data. To provide just a few non-limiting examples, sensor 106 data could include data for determining a position or status or state of a component or subsystem 108, a location of an object, a speed of an object, a type of an object, a slope of a roadway, a temperature, a presence or amount of moisture, eye gaze of the driver, position and/or pose of passengers in a vehicle, a fuel level, a data rate, etc.

Vehicle sensors 106 further include steering wheel sensors, such as a torque sensor that outputs a torque applied to the steering wheel 160, a rotary potentiometer that measures position and could be used to determine an angle of the steering wheel 160, and/or a contact sensor 208. The contact sensor 208 may be any suitable contact sensor such as a capacitive sensor in or on a steering wheel 160 to detect an object contact the steering wheel, i.e., a sensor that detects changes in an electric field caused by proximity to human skin, such as a surface capacitive sensor, a projected capacitive touch sensor such as a mutual capacitive sensor, a self-capacitive sensor, or the like.

Vehicle sensors 106 typically include one or more cameras 106-C (see FIG. 4), which can detect electromagnetic radiation in some range of wavelengths. For example, cameras 106-C may detect visible light, infrared radiation, ultraviolet light, or some range of wavelengths including visible, infrared, and/or ultraviolet light. For example, a camera 106-C can be a charge-coupled device (CCD), complementary metal oxide semiconductor (CMOS), or any other suitable type. For another example, the sensors 106 may include a time-of-flight TOF camera 106-C, which include a modulated light source for illuminating the environment and detect both reflected light from the modulated light source and ambient light to sense reflectivity amplitudes and distances to the scene.

The computer 104 may include programming to command one or more actuators to operate one or more vehicle 102 subsystems or components 108, such as vehicle 102 steering subsystem 108-S, and/or propulsion and/or braking subsystems. That is, the computer 104 may actuate control of acceleration in the vehicle 102 by controlling one or more of an internal combustion engine, electric motor, hybrid engine, etc., and/or may actuate control of brakes, steering, climate control, interior and/or exterior lights, etc. The computer 104 may include or be communicatively coupled to, e.g., via a vehicle network 112, more than one processor, e.g., included in subsystems 108 such as sensors 106, electronic control units (ECUs) or the like for monitoring and/or controlling various vehicle subsystems 108, e.g., ECUs or the like such as a powertrain controller, a brake controller, a steering controller, etc.

The vehicle components may include an HMI 110. The vehicle 102 can include an HMI 110 human-machine interface, e.g., one or more of a display, a touchscreen display, a microphone, a speaker, a haptic actuator, e.g., in a seat or steering wheel 160 of the vehicle 102, etc. The user can provide input to devices such as the computer 104 via the HMI 110. The HMI 110 can communicate with the computer 104 via the vehicle network 112, e.g., the HMI 110 can send a message including the user input provided via a touchscreen, microphone, a camera 106-C that captures a gesture, etc., to a computer 104, and/or can display output, e.g., via a screen, speaker, etc.

The vehicle network 112 is a communication network via which messages can be exchanged between various devices, e.g., computers 104, sensors 106, actuators included in subsystems 108, etc., in the vehicle 102. Computer 104 can be generally programmed to send and/or receive, via vehicle network 112, messages to and/or from other devices in vehicle 102 e.g., any or all of ECUs, sensors 106, actuators, subsystems 108, communications module, a human machine interface HMI 110, etc. Additionally or alternatively, messages can be exchanged among various such other devices in vehicle 102 via vehicle network 112. In cases in which computer 104 actually comprises a plurality of devices, vehicle network 112 may be used for communications between devices represented as computer 104 in this disclosure. Further, as mentioned below, various controllers and/or vehicle 102 sensors 106 may provide data to the computer 104. In some implementations, vehicle network 112 can be a network in which messages are conveyed via a vehicle 102 communications bus. For example, vehicle network 112 can include a controller area network CAN in which messages are conveyed via a CAN bus, or a local interconnect network LIN in which messages are conveyed via a LIN bus. In some implementations, vehicle network 112 can include a network in which messages are conveyed using other wired communication technologies and/or wireless communication technologies e.g., Ethernet, WiFi, Bluetooth, etc. Additional examples of protocols that may be used for communications over vehicle network 112 in some implementations include, without limitation, Media Oriented System Transport MOST, Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or Wi-Fi communication protocols.

Figure 2:
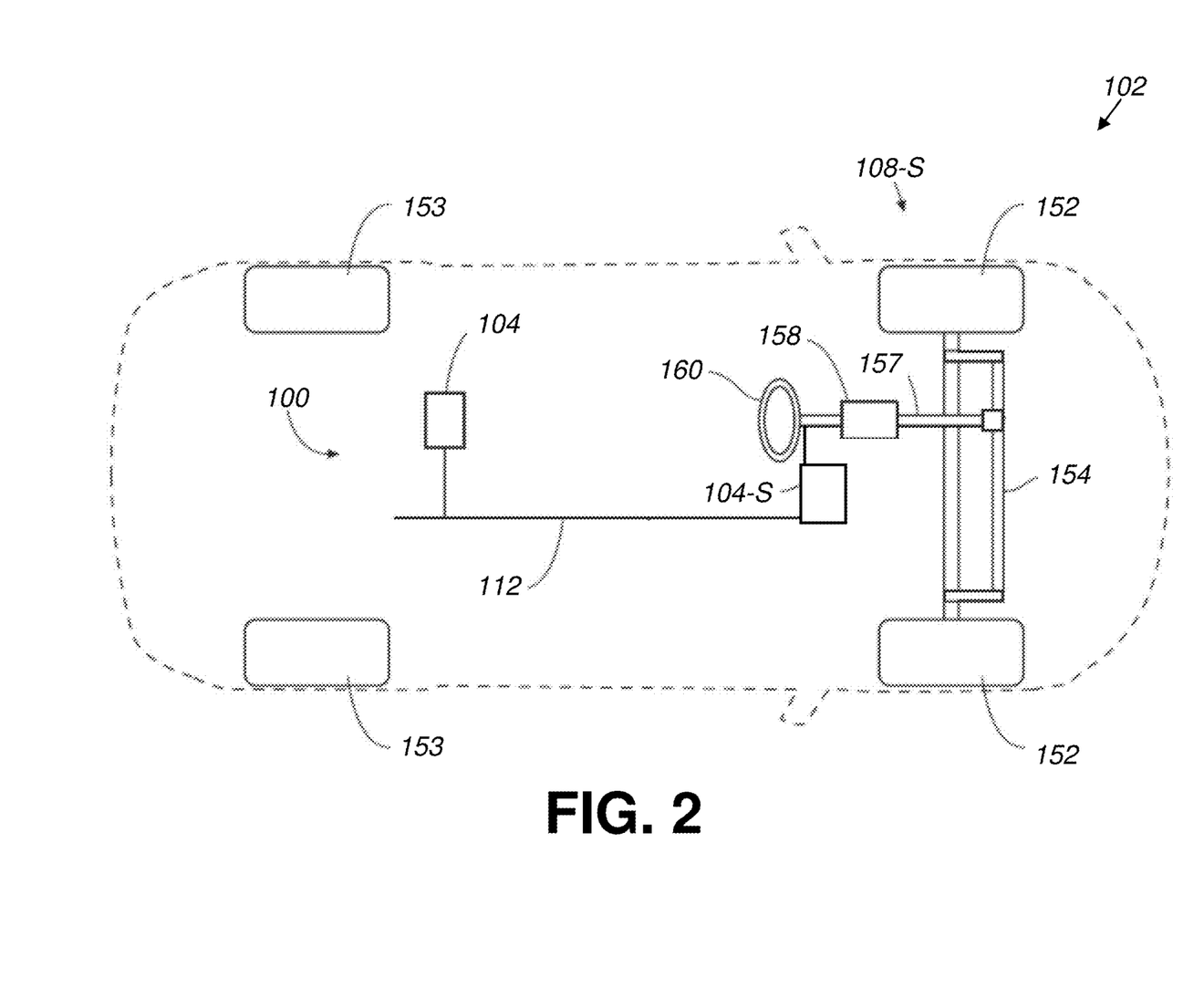
FIG. 2 is a block diagram illustrating aspects of the vehicle operation system of FIG. 1, including details of a steering subsystem.

FIG. 2 illustrates further aspects of the vehicle 102 including aspects of the steering system 108-S, which typically incorporates conventional elements of a vehicle steering subsystem to control the turning of front road wheels 152; rear wheels 153, could be, but typically are not, turnable by the steering subsystem 108-S. The steering system 108-S may be any suitable steer-by-wire system. The steering system 108-S may include one or more steering controllers such as an ECU 104-S that can be in communication with and receive input from a vehicle computer 104 via the network 112, and/or a human driver. The steering subsystem can further include steering sensors 108 (not shown in FIG. 2) as described above. The human driver may control the steering system 108-S via a steering wheel 160.

The steering system 108-S may be a conventional rack-and-pinion steering system. Alternatively or additionally, the steering system 108-S may be a Pitman-arm system, a rear-steer system, etc. (not shown). A steering rack 154 may be turnably coupled to the road wheels 152, for example, in a four-bar linkage. The position of the steering rack 154 determines the turning of the road wheels 152. Translational motion of the steering rack 154 results in turning of the road wheels 152. A steering column 157 may be coupled to the steering rack 154 via a rack and pinion, that is, gear meshing between a pinion gear and a rack gear (not shown).

The steering column 157 transfers or translates rotation of the steering wheel 160 to movement of the steering rack 154. The steering wheel 160 may be, e.g., a rigid ring fixedly attached to the steering column 157. The steering column 157 may be, e.g., a shaft connecting the steering wheel 160 to the steering rack 154. The steering column 157 may house one or more of the steering sensors 108 such as a torque sensor, as well as a motor 158 that can include gearing and a clutch, and that can turn a shaft in the steering column 157 to move the steering rack 154. In a drive-by-wire system, a steering controller or ECU 104-S can control actuation of the motor 158 according to a specified steering ratio, i.e., a ratio of an angle of steering wheel 160 rotation to a resulting angle of turning of wheels 152.

Figure 3A:
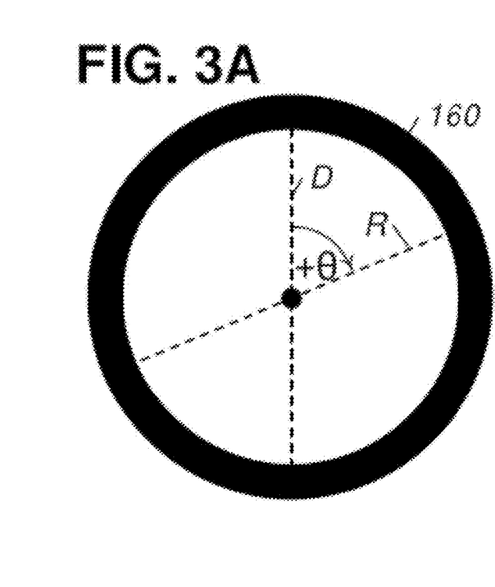
FIGS. 3A, 3B and 3C illustrate a steering wheel at respective first and second rotations.
Figure 3B:
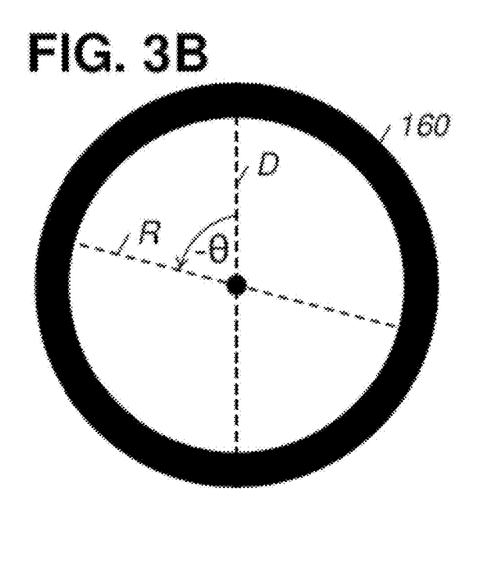
Figure 3C:
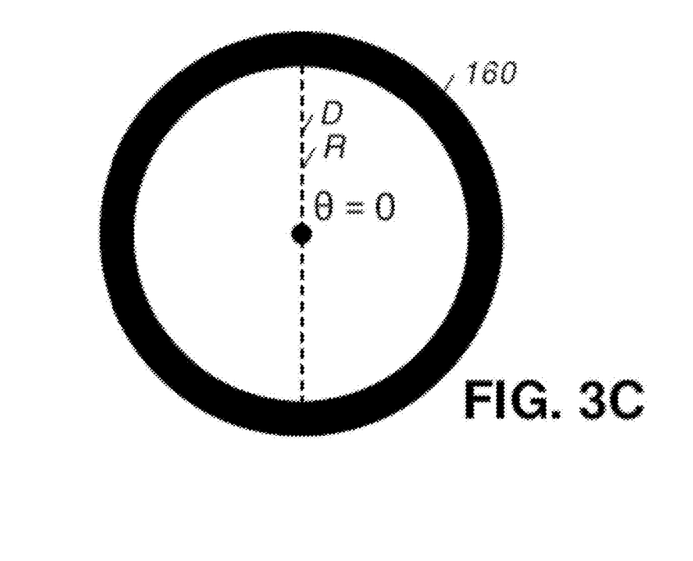

FIGS. 3A and 3B illustrate a steering wheel 160 at respective first and second angles of rotations. FIG. 3C is provided for reference to show the steering wheel 160 at a zero angle of rotation, which may also be referred to as no rotation, and/or as a default position. FIGS. 3A and 3B illustrate detecting a steering wheel 160 angle of rotation θ that is defined as an angle of movement or displacement of the steering wheel 160 from a default position D of an axis of a predetermined axis of the steering wheel 160 (e.g., a vertical axis), to a rotation position R. Put another way, a defined axis of the steering wheel 160 rotates from alignment with the default position D to the rotated position R. For convenience, this disclosure adopts the convention that a rotation in the rightward, or clockwise, direction defines a positive angle θ, and a rotation in the leftward, or counter-clockwise, direction defines a negative angle θ. Accordingly, in FIG. 3A, the steering wheel 160 is rotated in a clockwise direction, i.e., the angle of rotation θ is positive. In FIG. 3B, in contrast, the steering wheel 160 is detected to be rotated in a counterclockwise direction, i.e., the angle of rotation θ is denoted as a negative angle.

As mentioned above, a steering wheel 160 is a generally circular rigid ring. Further, it will be understood that the teachings with respect to steering wheel 160 described herein can be applied to implementations where the steering wheel 160 is some other shape, e.g., triangular, semicircular, trapezoidal, etc., or some combination of such shapes; in such and limitations, a center of rotation can be defined, and a circle can then be defined around the center of rotation.

Figure 4:
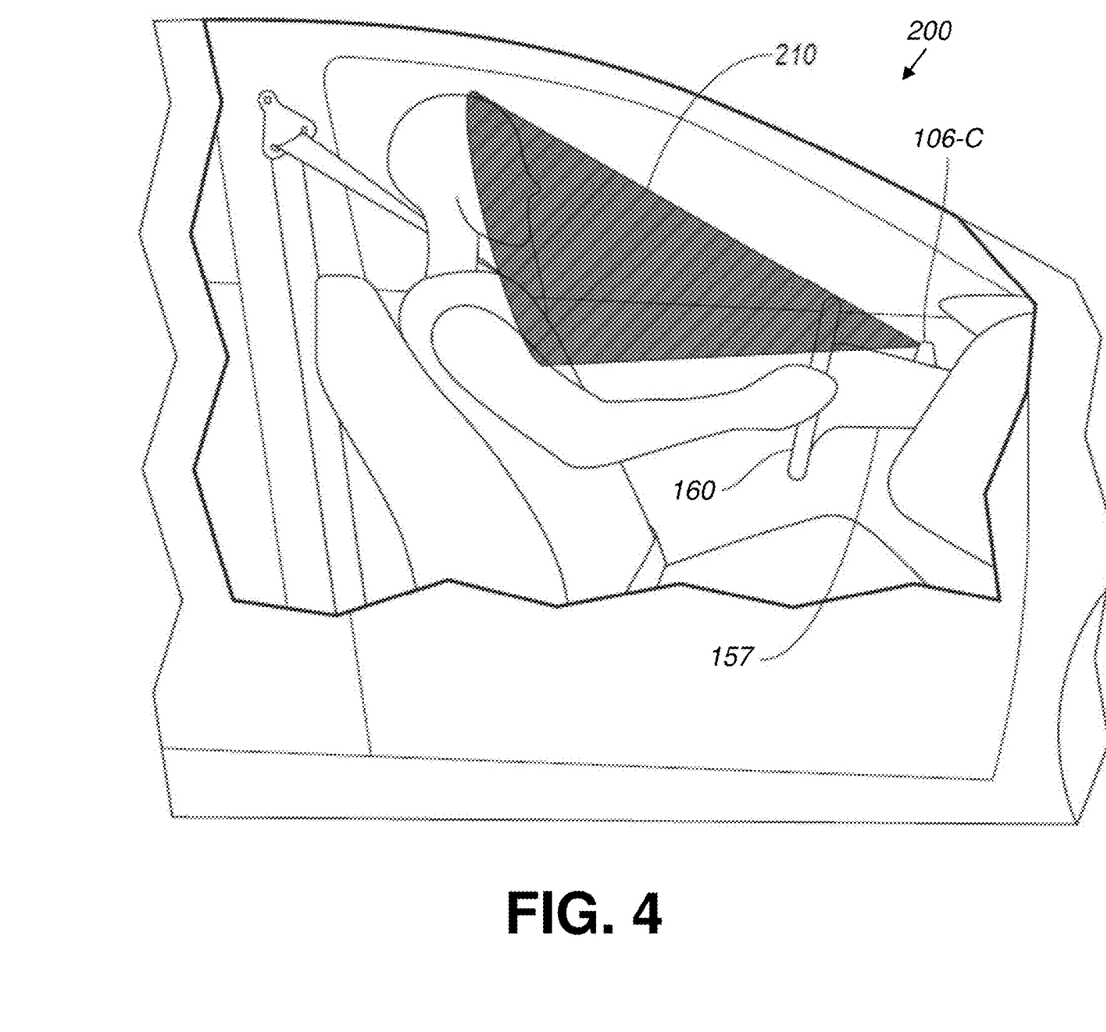
FIG. 4 illustrates a portion of a vehicle cabin.

FIG. 4 illustrates a portion of a vehicle cabin 200 including further elements of the vehicle operation system 100 in the vehicle 102, including a camera 106-C mounted to the steering column 157. As can be seen in FIG. 3, a camera 106-C can include a field of view 210 that encompasses a vehicle 102 operator and a portion of the steering wheel 160. Other cameras 106-C could alternatively or additionally be disposed in the vehicle cabin 200 and could have different fields of view 210 encompassing the vehicle 102 operator and/or some or all of the steering wheel 160. For example, multiple cameras 106-C may be disposed in a vehicle cabin 200. For example, in addition, or as an alternative, to a camera 106-C mounted to a steering column 157, the vehicle cabin 200 may include a camera 106-C mounted behind a driver with a forward-facing view that includes a field of view 210 (see FIG. 3) of a vehicle 102 operator and or the steering wheel 160. Yet further alternatively or additionally, a camera 106-C could be mounted in or on an interior cabin ceiling surface, on or proximate to an interior rearview mirror or mirror assembly, etc., whereby a camera 106-C alternatively or additionally could provide a side or rear view of a vehicle 102 operator and/or steering wheel 160. Further, one or more contact sensors 108 (not shown) can be embedded in and/or mounted on the steering wheel 160. Moreover, as mentioned above, a steering torque sensor 108 is typically provided and can output angles of rotation of a steering wheel 160.

One or more cameras 106-C in a vehicle cabin 200 can provide data to a vehicle computer 104 about an operator of the vehicle, and/or elements in a vehicle, such as the steering wheel 160 For example, any suitable driver state monitoring (DSM) system could be utilized to determine data about an operator such as an operator gaze direction, and orientation, position, and/or pose of an operator head, a position of other operator body parts, such as arms or hands, etc., based on image data from one or more cameras 106-C. For example, it will be understood that a computer 104 could detect a gaze direction of the operator in the image data, e.g., by using any suitable facial-detection technique, e.g., knowledge-based techniques such as a multiresolution rule-based method; feature-invariant techniques such as grouping of edges, space gray-level dependence matrix, or mixture of Gaussian; template-matching techniques such as shape template or active shape model; or appearance-based techniques such as eigenface decomposition and clustering, Gaussian distribution and multilayer perceptron, neural network, support vector machine with polynomial kernel, a naive Bayes classifier with joint statistics of local appearance and position, higher order statistics with hidden Markov model, or Kullback relative information. Then the computer 104 can use outputs produced as a byproduct of the facial detection that indicate the gaze direction of the eyes. It will be further understood that a position and/or pose of body parts of an operator and/or other elements in a vehicle, such as the steering wheel 160, could similarly be determined.

Figure 5:
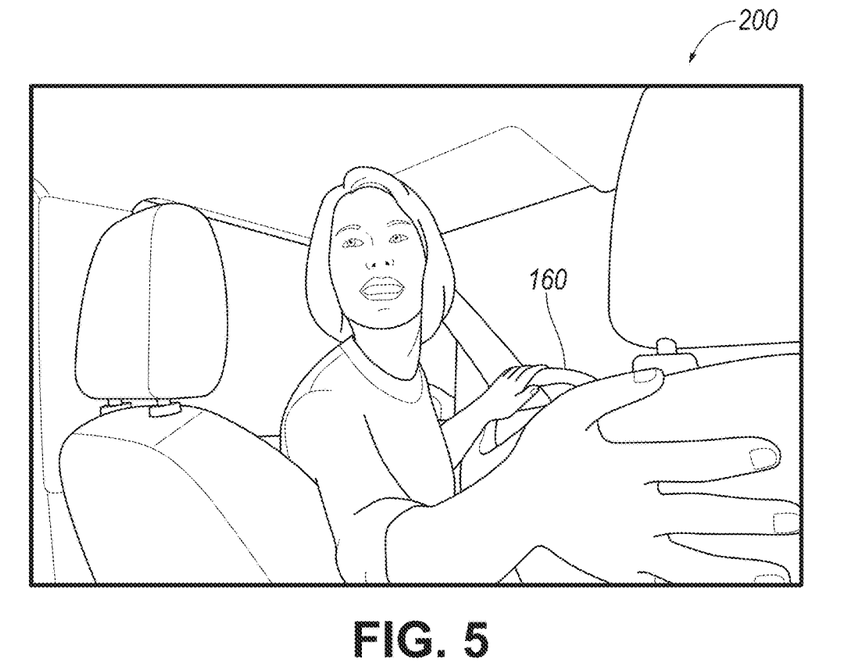
FIG. 5 illustrates an example of camera data providing an image in a vehicle cabin to support determining a maneuvering scenario.

In one implementation, a computer 104 could determine a direction of an operator's gaze, e.g., forward toward a roadway, directed toward an interior rearview mirror, directed toward a left or right exterior rearview mirror, etc. FIG. 5 illustrates an example in which camera 106-C data is used to determine that an operator is facing rearward, and moreover, that a location of operator body parts, such as the operator's hand on a rear of a front passenger seat, indicates that the operator is in a pose to perform a maneuver that includes operating the vehicle 102 in reverse. As illustrated in FIG. 5, the computer 104 could determine a position or pose of an operator's head, e.g., whether the operator is facing in a forward direction to operate the vehicle, whether the operator is turning their head to the left or right, or rearward, etc.

Figure 6:
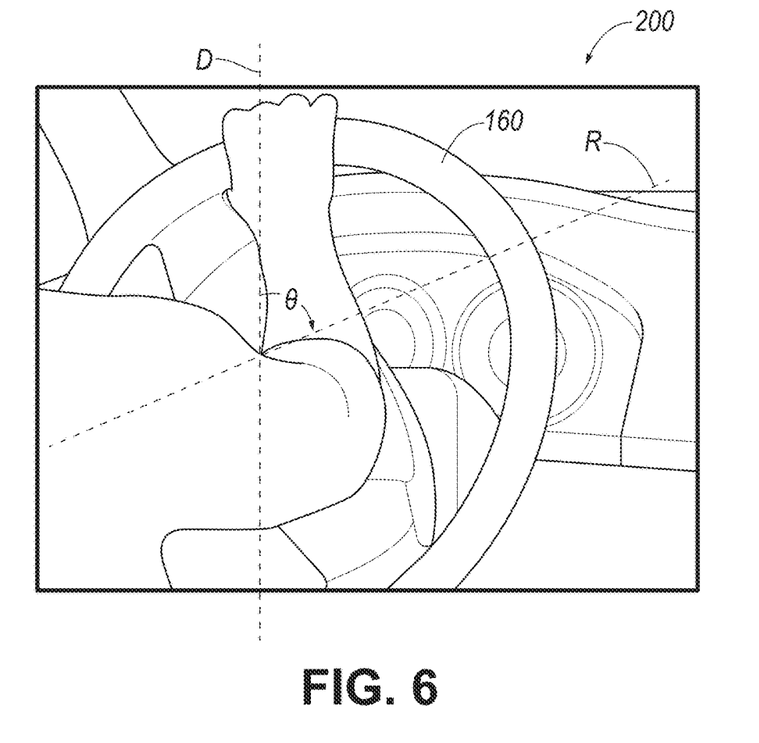
FIG. 6 illustrates a further example of an example of camera data providing an image in a vehicle cabin to support determining a maneuvering scenario.

Further, although as mentioned above, the steering wheel 160 angle of rotation typically may be determined by steering wheel sensors 106, it will be understood that a steering wheel 160 rotation could alternatively or additionally be determined by data from one or more cameras 106-C. FIG. 6 illustrates an example in which camera 106-C data could be used to determine an angle of rotation of the steering wheel 106 and/or a position of an operator's body part such as a hand positioned on the steering wheel 160, that indicates that the operator is performing a turning maneuver.

Yet further, camera sensors 106 mounted to and/or with a field of view of an exterior of a vehicle 102 could provide data for a computer 104 to detect objects around the vehicle 102, as noted above. In one example, image data from one or more camera sensors 106 could be analyzed, e.g., using image recognition techniques such as those mentioned above, to identify objects indicating a maneuvering scenario. For example, image data could indicate painted lines or the like on a ground surface indicating parking spaces, a street curb, a parking meter, etc., from which a parking maneuvering scenario could be identified.

Alternatively or additionally, data from sensors 106 other than steering wheel or camera sensors 106 could be used to identify a maneuvering scenario. For example, a vehicle 102 could include one or more sensors 106 to detect a presence of a trailer being towed by the vehicle 102. Further for example, a vehicle 102 could include radar and/or ultrasonic sensors to detect objects such as a street curb, and/or a forward and/or rearward vehicle to identify a parallel parking maneuvering scenario.

Figure 7:
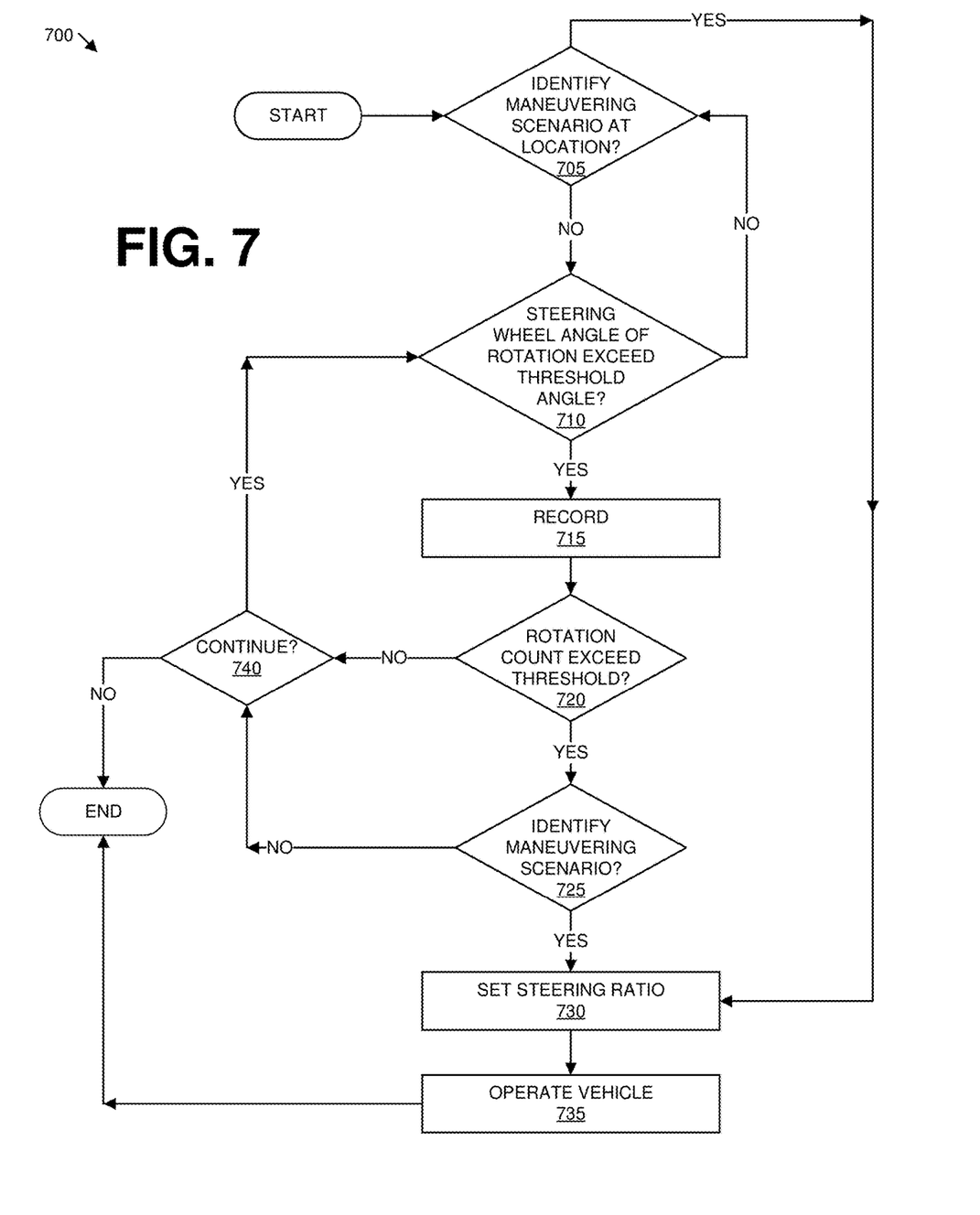
FIG. 7 is a process flow diagram illustrating an example process for operating a steering control system.

FIG. 7 is a process flow diagram illustrating an example process 700 for operating a steering control system. The process 700 can be implemented in a vehicle computer 104, or in some examples, the vehicle computer 104 could represent multiple computing devices, e.g., a plurality of vehicle 102 ECUs or the like.

The process 700 begins in a block 705, in which the computer 104 determines whether the vehicle 102 is at a location for which a maneuvering scenario is stored. For example, the computer 104 could store locations in the form of GPS coordinates or the like, and could further store maneuvering scenarios specified for the respective locations. For example, a reverse parking scenario could be stored for a home location, a forward parking scenario could be stored for an office parking area location, a trailer scenario could be stored for a boat ramp location, etc. As a prerequisite to identifying a maneuvering scenario, the computer 104 could further be programmed to check that the vehicle 102 is operating at or below a specified speed threshold, because if the vehicle 102 is traveling over the speed threshold, it is unlikely that the vehicle 102 will be performing a maneuvering scenario and it may further be undesirable to alter a vehicle 102 steering ratio. If a maneuvering scenario is identified at a location, then the process 700 can proceed to a block 730. Otherwise, the process 700 can proceed to a block 710. Alternatively, although not illustrated, implementations are possible in which the blocks 710-725 are omitted, and the process 700 proceeds to a block 740 upon a negative determination in the block 705.

In the block 710, which may follow the block 705 (or implementations are possible in which the block 705 is omitted) during vehicle 102 operation, the computer 104 determines whether, e.g., based on steering sensor 106 and/or camera sensor 106-C data, that a steering wheel 160 has been rotated in excess of a specified threshold. The threshold may be an absolute value of an angle of rotation, i.e., the steering wheel 160 may have been rotated in a negative or positive, e.g., counterclockwise or clockwise, direction. The rotation threshold may be empirically determined for a type of vehicle 102 (e.g., make, model, model year, and/or trim level), and may further be dependent on a vehicle 102 speed. That is, determining a steering ratio as described herein may include determining a vehicle speed and/or a vehicle type, in addition to determining steering wheel angles of rotation. Put another way, determining a maneuvering scenario and/or a steering ratio may be calibrated for a vehicle 102 type and/or speed. While operating the vehicle 102 in the driving environments, various steering wheel 160 angles of rotation and/or vehicle 102 speeds could be recorded, and steering wheel angles of rotation and/or vehicle 102 speeds determined to indicate a maneuvering scenario warranting adjustment of a steering ratio could be recorded, and then the steering wheel angle threshold and or the speed threshold could be implemented in a computer 104 of a vehicle 102.

For example, in some implementations, the process 700 is initiated only when a vehicle 102 speed is below a specified speed threshold, or, put another way, in some implementations the steering wheel angle of rotation can be determined to exceed the threshold angle, i.e., the determination of the block 710 can be yes, only when the vehicle 102 speed is below the speed threshold. The speed threshold may also be empirically determined. For example, a rotation threshold could be specified as an angle that is a percentage of a complete rotation (i.e., a 360° rotation) of the steering wheel 160. In one implementation, rotation threshold is 40%, i.e., 144°. In one implementation, the speed threshold is 10 mph (miles per hour). Empirically determining the rotation threshold and/or speed threshold means that a vehicle 102 could be operated in a driving environment, e.g., on a test track, on a test surface simulating a parking lot, driveway, garage, etc., and/or on a real-world environment such as a driveway, parking lot, garage, etc., whereupon steering wheel rotations and/or speeds could be recorded and then selected for use.

Implementations are also possible in which the speed threshold is omitted and/or in which a steering ratio adjustment, as discussed further with respect to the block 730 below, is at least in part speed-dependent in addition to being dependent on a maneuvering scenario. For example, a vehicle 102 could be traveling at a highway speed, e.g., 45 mph or greater, and a lane change or turning (e.g., exit ramp) scenario could be identified. In this example, the maneuvering scenario could be identified based on a vehicle 102 location (on a highway), a status of a vehicle component 108 (e.g., turn signal or other indicia of turning or a lane change activated), in addition to or as an alternative to considering vehicle 102 speed.

The process 700 typically remains in the block 710 during operation of the vehicle 102 unless the steering wheel rotation threshold and/or speed threshold are determined to be exceeded, in which case the process 700 proceeds to a block 715 to store the steering wheel rotation and possibly also vehicle 102 speed in excess of the rotation and/or speed thresholds. The steering wheel rotation and/or vehicle 102 speed are typically stored with a timestamp, i.e., an indicia indicating a time at which the data was recorded.

Following the block 715, in a block 720, the computer 104 determines whether a steering wheel rotation count has exceeded a count threshold. Herein, a steering wheel rotation count means a number of times that a steering wheel rotation angle has exceeded a steering wheel angle rotation threshold. If the steering wheel rotation angle exceeds the steering wheel angle rotation threshold by a predetermined number of times, i.e., the count threshold, then the process 700 can proceed to a block 725. Otherwise, the process 700 proceeds to the block 740. The count threshold can be determined empirically, e.g., as a number of times that a steering wheel is turned significantly (i.e., exceeds the steering wheel angle rotation threshold), indicating that the vehicle may be executing a maneuvering scenario warranting adjustment of a steering ratio.

Typically, it is useful to ensure the likely existence of a maneuvering scenario by monitoring at least four steering wheel rotations exceeding the angle rotation threshold, but it is possible that a maneuvering scenario could be indicated by fewer than four steering wheel rotations exceeding the angle rotation threshold. Accordingly, although not illustrated, as an alternative to executing the blocks 715, 720, the process 700 could proceed directly to the block 725 following the block 710. That is, the blocks 715, 720 include using data from the vehicle sensors 108 to identify the current vehicle maneuvering scenario data about at least a third steering wheel rotation and a fourth steering wheel rotation each exceeding the rotation threshold, in addition to the first and second rotations identified in the block 710.

In the block 725, the computer 104 determines whether a maneuvering scenario warranting adjustment of a steering ratio is identified, and if so proceeds to a block 730, and otherwise proceeds to the block 740. Example of possible vehicle maneuvering scenarios include a parallel parking scenario, a reverse-parking scenario, a forward-parking scenario, or a trailer maneuvering scenario.

The computer 104 can utilize various data to identify a maneuvering scenario (or to determine that a maneuvering scenario cannot be identified). For example, the maneuvering scenario may be determined at least in part based on a vehicle location. For example, as mentioned above, a vehicle 102 location sensor 106 (e.g., a GPS or Global Positioning System sensor) could provide a vehicle 102 location, and the vehicle computer 104 could access stored map data (and/or could retrieve map data from a remote server via wireless communications) to determine that the vehicle 102 location is a location associated with a maneuvering scenario, e.g., a parallel parking, forward parking, and/or reverse parking scenario, such as a user's driveway or parking lot, a city street, etc. Alternatively or additionally, the computer 104 could determine a maneuvering scenario, and hence an adjusted steering ratio, based at least in part on historical data about a determined location. For example, the computer 104 could store data about a location of a user's home or office indicating a typical parking maneuver, e.g., a parallel parking maneuver or reverse parking maneuver. Yet further, the computer 104 could store data about a location indicating that a maneuvering scenario should not be determined for the location, i.e., a steering ratio adjustment should not be made at, i.e. should be suppressed for, the location. For example, if a vehicle 102 is at a location at which a maneuvering scenario is unlikely to be conducted, e.g., a public highway, adjustments could be suppressed.

In another example, camera sensors 106-C could be used as described above to determine a vehicle 102 occupant position and/or pose, e.g., that the occupant is looking in rearview mirrors, looking out a rear window, is positioned to be backing the vehicle, etc. In yet another alternative or additional possible example, as mentioned above, vehicle 102 exterior camera sensors 106 could be used to detect objects around a vehicle 102 that can indicate a maneuvering scenario, such as lines or other indicia of a parking area.

In one example, the computer 104 could determine whether a maneuvering scenario warranting adjustment of a steering ratio is identified based on user input to a vehicle HMI 110. Upon determining that a rotation count is exceeded, for example, the computer 104 could output a query to a user, e.g., via a touchscreen or the like, to provide input indicating whether the vehicle 102 is in a maneuvering scenario. The user input could be requested in combination with a determination made based on sensor 106 data. For example, the computer 104 could determine based on a vehicle 102 location and/or based on camera sensor 106 data that the vehicle is in a parking area. The computer 104 could then output a query to the user to request input confirming that the vehicle 102 is in a maneuvering scenario and/or to specify a type of maneuvering scenario, e.g., parallel parking, reverse parking, trailer maneuvering, etc.

As illustrated by the above examples, a maneuvering scenario could be identified or a determination could be made that a maneuvering scenario is not identified by the computer 104 receiving a plurality of data including that a rotation count has exceeded a threshold and other data such as one or more of a vehicle 102 location, camera sensor 106 data including images of a vehicle occupant and/or objects around the vehicle, and/or user input. Based on empirical testing and/or design considerations, e.g., based on simulations, the computer 104 could be programmed to consider different data in combination based on appropriate weights to be given to combinations of such data.

In the block 730, which follows the block 725 when a maneuvering scenario is identified, the computer 104 sets a steering ratio for the vehicle steering subsystem 108-S. That is, the computer 104 determines an adjusted or revised steering ratio for the vehicle steering subsystem 108, typically an adjustment from a default steering ratio used during operation of the vehicle 102. The adjusted steering ratio can be determined the type of the vehicle 102, and could further be based on the type of maneuvering scenario. For example, empirical testing for a type of vehicle 102 could determine one or more steering ratios for respective types of maneuvering scenarios, e.g., a steering ratio for a trailer maneuvering scenario could be different than a steering ratio for a parallel parking scenario. Yet further, a "steering ratio" in the present context could refer to a set of steering ratios for a vehicle 102 maneuvering scenario where a steering ratio changes as a steering wheel angle, vehicle steering angle, and/or vehicle speed change, e.g., according to values chosen based on empirical testing and/or simulation. As discussed above, a steering ratio may be based on a vehicle speed in addition to or as an alternative to a maneuvering scenario; e.g., empirical testing may determine appropriate steering ratios for a vehicle 102 at different speeds or ranges of speeds for a lane change, and exit ramp for entrance ramp scenario, etc. The determined steering ratio(s) can be implemented in an ECU or the like for the steering subsystem 108-S.

Next, in a block 735, the vehicle 102 is operated according to the steering ratio set in the block 730. For example, when an operator provides input to the steering subsystem 108-S, i.e., by turning the steering wheel, the steering rack 154 can be actuated to move to change the vehicle 102 steering angle, i.e., an angle of vehicle wheels 152 to a longitudinal axis of the vehicle 102, according to the set steering ratio.

Following the block 735, the process 700 ends. Alternatively, although not shown in FIG. 7, the process 700 could proceed to the block 740 to determine whether to continue the process 700 following the block 735. For example, it is possible that a vehicle 102 could operate at a location having a first maneuvering scenario, e.g., entering a garage or parking area, and then operate at a second location, e.g., interior of the garage or parking area having a second maneuvering scenario, e.g., a reverse parking scenario. Accordingly, a steering ratio could be adjusted as a location of the vehicle 102 changes, that is, after actuating a vehicle according to a first steering ratio, a vehicle could be actuated according to a second steering ratio determined based on a second maneuvering scenario. Process 700 could continue after the block 740 to return to the block 710 after a first maneuvering scenario was complete to determine whether a second maneuvering scenario was being conducted. Yet further for example, the vehicle could resume a speed above a speed threshold discussed above without having been powered off, whereupon the process 700 could continue.

In the block 740, the computer 104 determines whether the process 700 is to continue. For example, the vehicle 102 could be powered off, a user to provide input to deactivate the process 700, etc. If the process 700 is not to continue, then the process 700 end following the block 740. Otherwise, the process 700 returns to the block 710.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The adjectives first and second are used throughout this document as identifiers and, unless explicitly stated otherwise, are not intended to signify importance, order, or quantity.

The term exemplary is used herein in the sense of signifying an example, e.g., a reference to an exemplary widget should be read as simply referring to an example of a widget.

Use of in response to, based on, and upon determining herein indicates a causal relationship, not merely a temporal relationship. Further, the indicated relationship is non-exclusive unless expressly stated otherwise. For example, the statement "A is based on B" means that A is at least partly, i.e., partly or entirely, based on B.

Computer executable instructions may be compiled or interpreted from computer programs created using a variety of programming languages and/or technologies, including, without limitation, and either alone or in combination, Java, C, C++, Visual Basic, Java Script, Perl, Python, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

The invention claimed is:

1. A system, comprising a processor and a memory, the memory storing instructions executable by the processor such that the processor is programmed to:
identify a vehicle maneuvering scenario based on data from vehicle sensors including data indicating that a first steering wheel rotation in a first direction and a second steering wheel rotation in a second direction each exceed a rotation threshold;
determine a steering ratio based on the vehicle maneuvering scenario; and
actuate vehicle steering according to the steering ratio.

2. The system of claim 1, wherein the instructions to identify the vehicle maneuvering scenario further include instructions to identify the vehicle maneuvering scenario based on a vehicle speed.

3. The system of claim 1, wherein the instructions to determine the steering ratio further include instructions to determine the steering ratio based on a vehicle speed.

4. The system of claim 1, wherein the instructions to determine the steering ratio further include instructions to determine the steering ratio based on a type of the vehicle maneuvering scenario.

5. The system of claim 4, wherein the type of the vehicle maneuvering scenario is one of a parallel parking scenario, a reverse-parking scenario, a forward-parking scenario, or a trailer maneuvering scenario.

6. The system of claim 1, wherein the instructions to determine the steering ratio further include instructions to determine the steering ratio based on user input confirming the vehicle maneuvering scenario.

7. The system of claim 1, wherein the instructions to determine the steering ratio further include instructions to adjust the steering ratio based on historical data for a location of the vehicle.

8. The system of claim 1, wherein the instructions to determine the steering ratio further include instructions to suppress an adjustment to the steering ratio based on a vehicle location.

9. The system of claim 1, wherein the instructions to determine the steering ratio further include instructions to adjust the steering ratio as a location of the vehicle changes.

10. The system of claim 1, wherein the data from the vehicle sensors to identify the current vehicle maneuvering scenario further include data about a vehicle occupant.

11. The system of claim 10, wherein the data about a vehicle occupant includes image data showing that the occupant is checking vehicle mirrors and/or looking out of a rear window.

12. The system of claim 1, wherein the instructions further include instructions to determine a second steering ratio based on determining a second maneuvering scenario after actuating the vehicle steering according to the steering ratio, and to actuate the vehicle steering according to the second steering ratio.

13. The system of claim 1, wherein the data from the vehicle sensors to identify the current vehicle maneuvering scenario further include data about a third steering wheel rotation and a fourth steering wheel rotation each exceeding the rotation threshold.

14. The system of claim 1, wherein the steering ratio is calibrated for a type of the vehicle.

15. The system of claim 1, wherein the steering ratio is calibrated for a speed of the vehicle.

16. A method, comprising:
identifying a vehicle maneuvering scenario based on data from vehicle sensors including data indicating that a first steering wheel rotation in a first direction and a second steering wheel rotation in a second direction each exceed a rotation threshold;
determining a steering ratio based on the vehicle maneuvering scenario; and
actuating vehicle steering according to the steering ratio.

17. The method of claim 16, further comprising identifying the vehicle maneuvering scenario based on a vehicle speed.

18. The method of claim 16, further comprising determining the steering ratio based on a vehicle speed and/or a type of the vehicle maneuvering scenario and/or based on historical data for a location of the vehicle.

19. The method of claim 16, further comprising adjusting the steering ratio as a location of the vehicle changes.

20. The method of claim 16, wherein the data from the vehicle sensors to identify the current vehicle maneuvering scenario further include data about a vehicle occupant.

* * * * *